United States Patent [19]

Myers et al.

[11] 4,390,357
[45] Jun. 28, 1983

[54] METHODS OF AND SYSTEM FOR CLEAN AIR DELIVERY TO LIGHTGUIDE FIBER DRAWING APPARATUS

[75] Inventors: Daryl L. Myers, Lawrenceville; Stanley Rice, Atlanta, both of Ga.

[73] Assignee: Western Electric Company, Inc., New York, N.Y.

[21] Appl. No.: 316,166

[22] Filed: Oct. 29, 1981

[51] Int. Cl.³ .......................................... C03B 37/025
[52] U.S. Cl. ............................................. 65/2; 55/97; 55/485; 65/13
[58] Field of Search .................. 65/2, 3.11, 13; 55/97, 55/485

[56] References Cited

U.S. PATENT DOCUMENTS 4,065,280 12/1977 Kao et al. ............................. 65/3.12
4,333,745  6/1982 Zeanwick ........................... 55/485 X

OTHER PUBLICATIONS

"Weber Contamination Control Rooms," Weber Technical Products, 1975, pp. 1–16.

Primary Examiner—Richard V. Fisher
Attorney, Agent, or Firm—E. W. Somers

[57] ABSTRACT

A system (20) for providing clean air to an apparatus (24) for drawing lightguide fiber (21) from a preform (22) includes a plenum (52) and ducts through which room air is pulled and filtered. The filtered air is flowed into each of a plurality of stacked enclosures (66, 67, and 68) each of which surrounds partially the drawing apparatus and portions of the preform and/or fiber. Also, the filtered air is directed transversely past the fiber and preform at a velocity which is sufficiently low to avoid undue flutter of the fiber. Filters are arranged in ascending magnitude of efficiency proceeding from an intake (41) for the room air to the vicinity of the preform and fiber. A delivery system which is associated with each drawing apparatus is considerably less expensive than a clean room and allows maintenance of any one system or its associated drawing apparatus without discontinuing the drawing operation of other systems in the same room.

14 Claims, 5 Drawing Figures

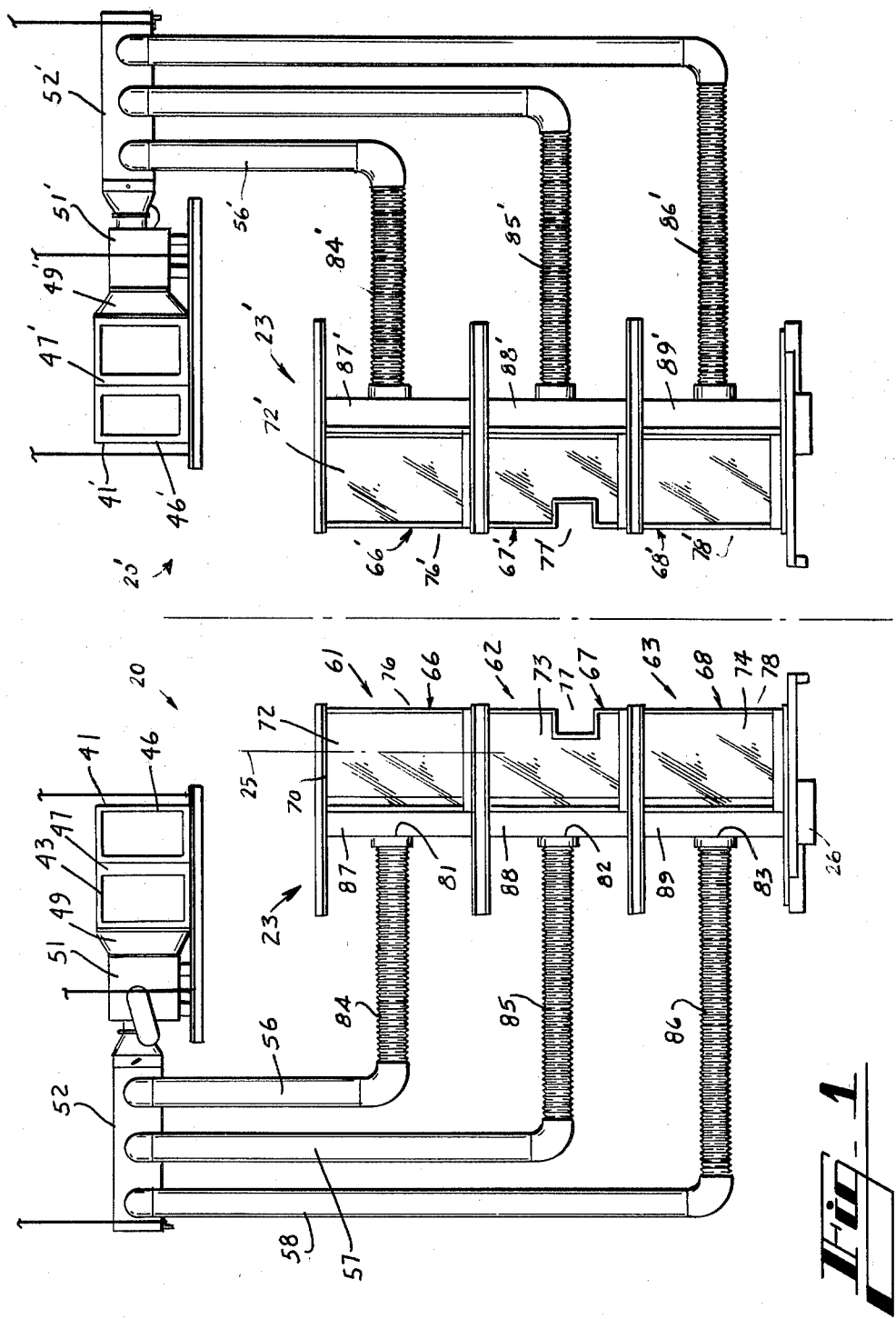

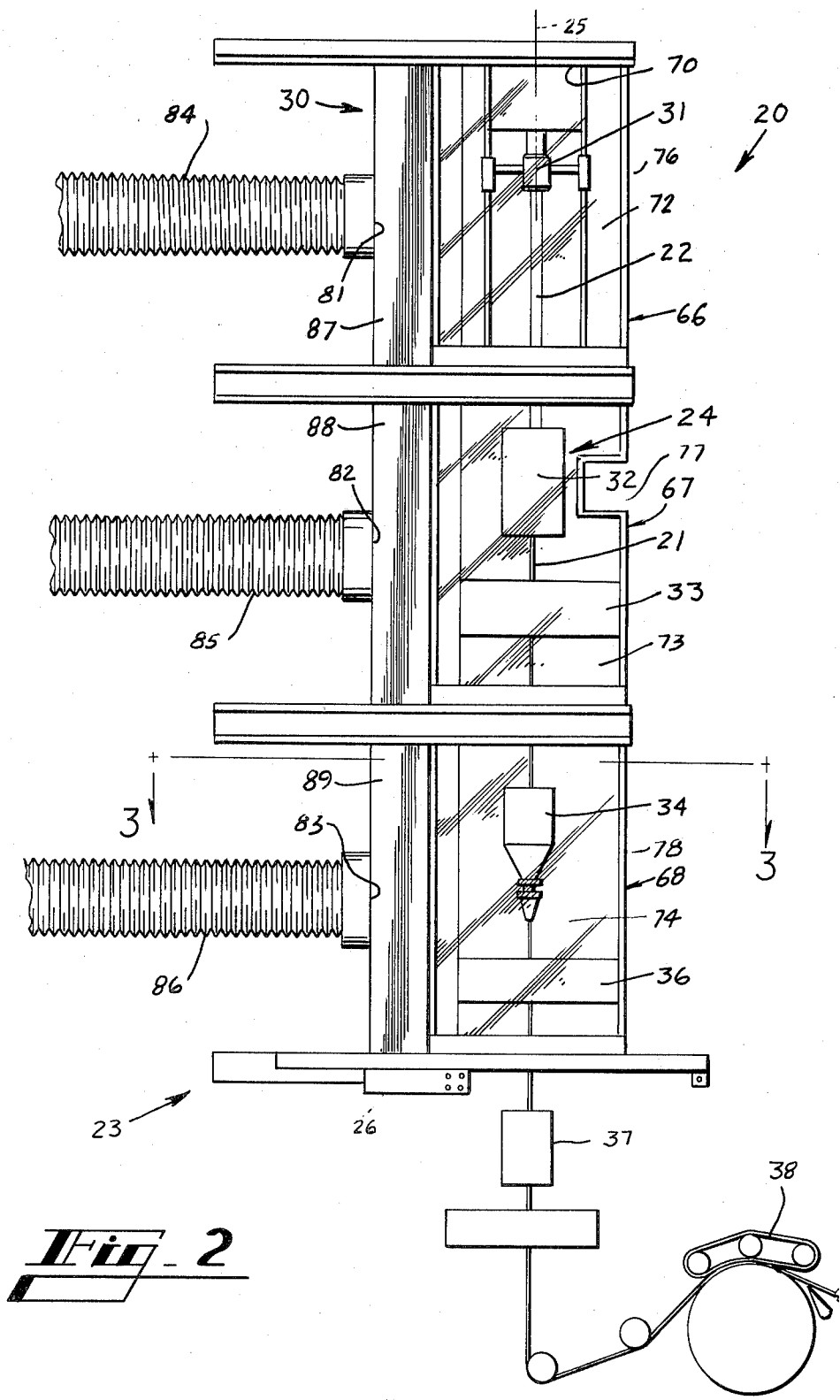
Fig_2

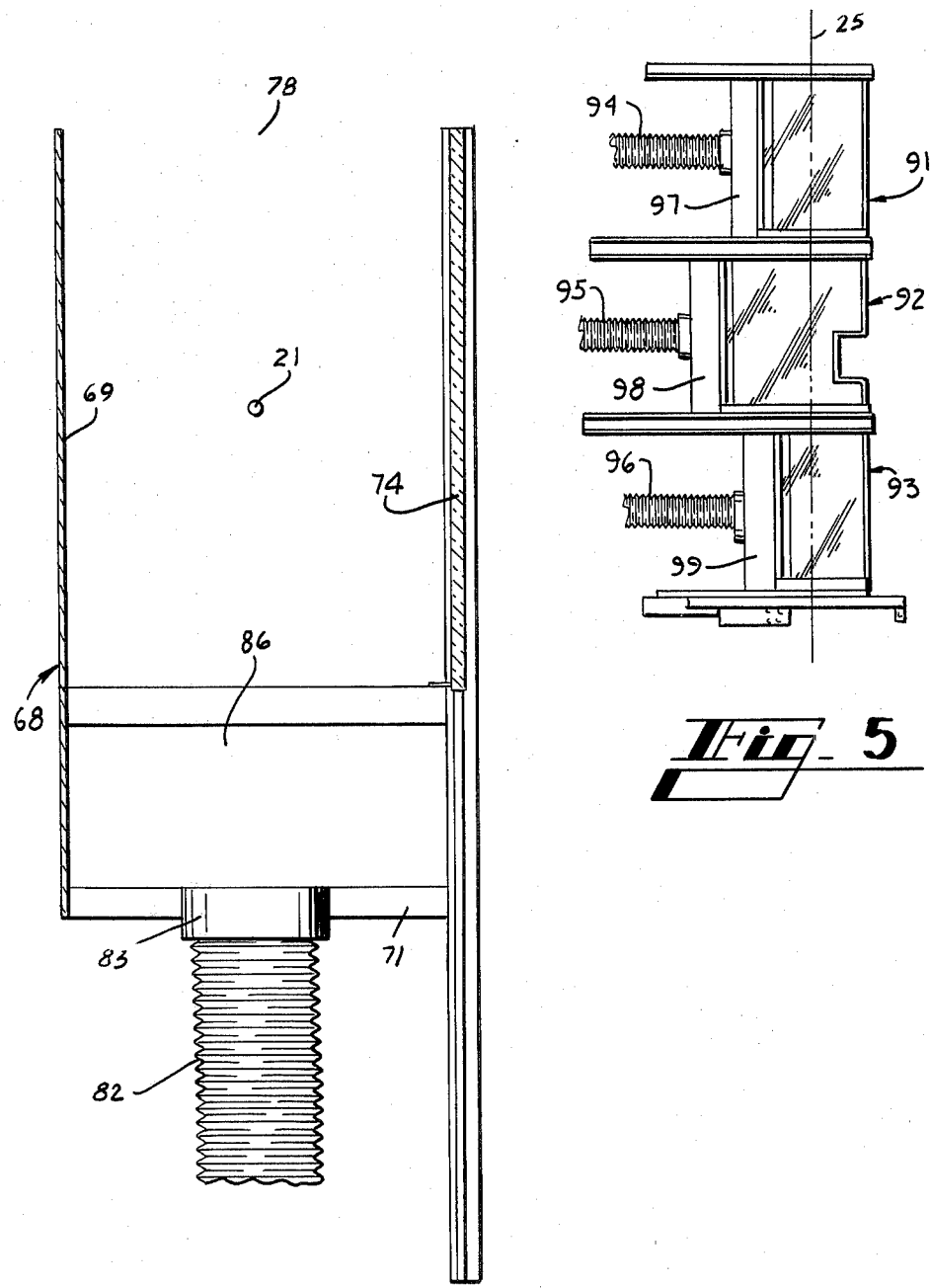

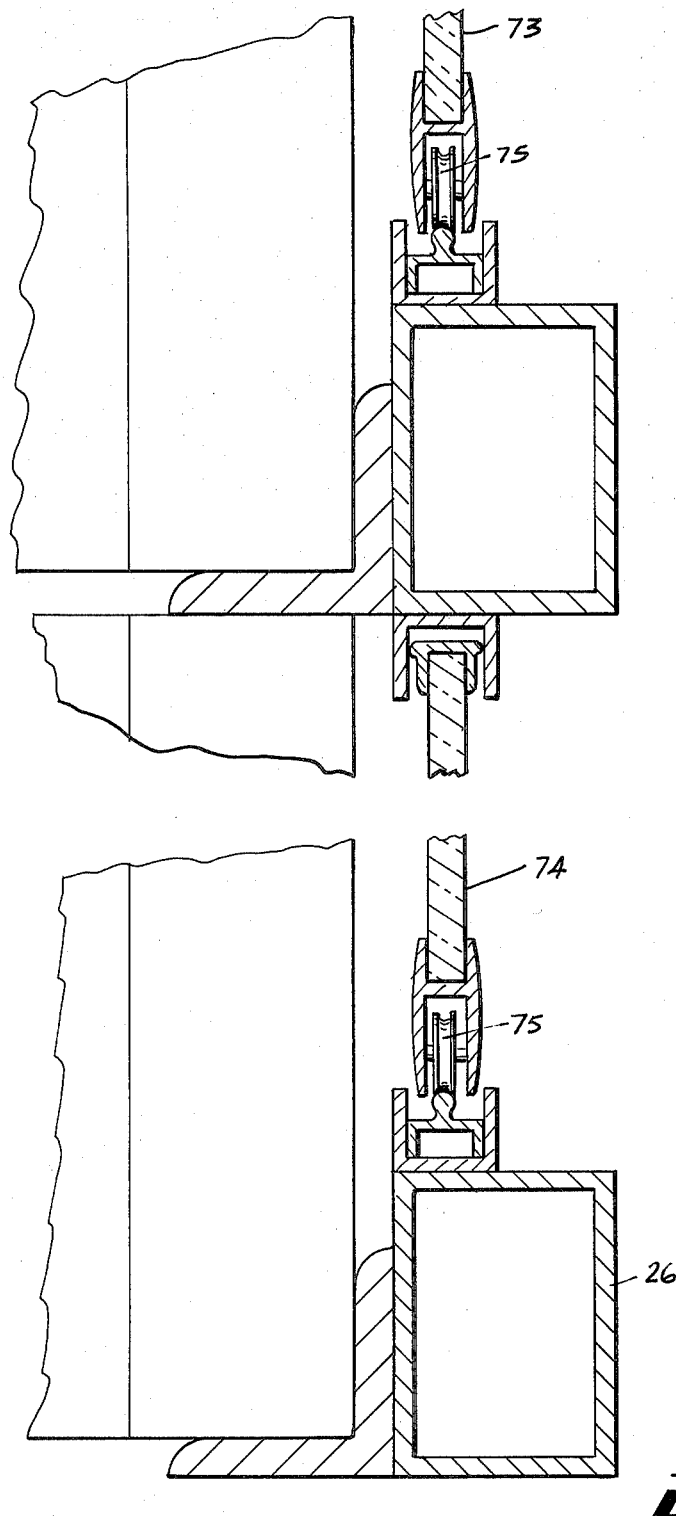
Fig_4

METHODS OF AND SYSTEM FOR CLEAN AIR DELIVERY TO LIGHTGUIDE FIBER DRAWING APPARATUS

TECHNICAL FIELD

This invention relates to methods of and a system for clean air delivery to lightguide fiber drawing apparatus. More particularly, it relates to a clean air delivery system for preventing contamination of a vertically suspended preform and of lightguide fiber which is drawn from the preform.

BACKGROUND OF THE INVENTION

Not for some time has there been as significant a developement in telecommunications as lightwave technology which is manifested in the use of lightguide fibers. Optical or lightguide fibers are versatile as a transmission medium—all forms of information be it voice, video, or data can be carried on a lightguide fiber. Also, lightwave systems are ideally suited to the high bandwidth requirement of digital transmission and hence are well-matched to the evolving transmission network in this country.

Fibers for lightwave communications are drawn from a preform—an elongated cylinder of glass having an inner core and an outer cladding—with the thickness of the core and the cladding being in the same ratio in the fiber as they are in the preform. A drawing system is well-described in an article by D. H. Smithgall and D. L. Myers in the Winter 1980 issue of *THE WESTERN ELECTRIC ENGINEER*. The preform which is 7 to 25 mm in diameter and as much as 100 cm in length is heated locally and symmetrically to temperatures in excess of 2000° C. As the preform is fed into a heating zone, such as in a furnace for example, fiber is drawn from molten material of a necked-down portion, yielding a substantial replica of the preform cross-section.

The drawn fiber is coated and taken up on a lightweight, plastic spool such that end portions of the fiber on each spool are available for testing. The spools of drawn, tested fiber are subsequently used to supply ribbon and/or cabling apparatus.

During the fiber drawing process, contaminants such as dust can pass from the heating zone or ambient air to the glass preform, its molten portion or the drawn fiber. As a result, the tensil strength of the fiber is reduced considerably and attenuation may be increased. A discussion of these problems is contained in an article by H. Aulich et al "Preparation of Optical Fibers of High Tensile Strength," Siemens Forschungs-Und Entwicklungsperreicht, Volume 7, No. 3, 1978, pps. 165-168.

Production of long lengths of fibers with high strength is crucial to increasing fiber yields and lowering the cost. Although long lengths of relatively high strength fiber have been produced in a laboratory atmosphere, their routine manufacture in a production environment has remained a challenge. The factors affecting fiber strength are well understood.

The causes of low strength fiber fall into several different categories. These include surface damage due to foreign particles at the fiber surface, surface scratching due to abrasion with a foreign surface, surface damage on the thin side of the coating of a poorly centered fiber, and internal voids or inclusions in the glass.

It is well known that surface flaws are the major causes of strength reduction. There are numerous materials and processing parameters that affect the severity and distribution of the surface flaws. One of the major factors contributing to the generation of surface flaws in a drawing environment is the accumulation of particles on the glass surface of the drawn fiber. Inorganic particles in and above the furnace or in the environment between the furnace and a coating applicator can impact the fiber surface to produce scratches, or can be drawn inside the furnace by the upward draft and impact the necked-down portion of the preform thereby causing weak points. Also, particles can descend into the coating applicator and engage the surface of the drawn fiber passing through the coating.

It should be readily apparent that one obvious solution to the problem of surface contamination is to cause the entire room in which a plurality of drawing apparatus are located to have a predetermined cleanliness. This kind of arrangement, which requires a substantial investment of capital is well known to the industry that manufactures electronic devices such as semiconductors. There, the intent is to provide a totally clean environment. In contrast, in drawing lightguide fiber, the intent is to keep the glass clean during the drawing operation which seemingly generates more contaminants than do operations in the electronic devices industry. Prior to the drawing operation, the preform is stored in clean chambers, and after the fiber is drawn, it is coated to protect it from atmospheric contaminants.

What is needed and what the prior art seemingly does not provide are methods and apparatus for causing the drawing of lightguide fiber from a preform to be accomplished in a clean environment. A clean air delivery and maintenance system is required to prevent contaminants from settling on the preform and the glass fiber in order to avoid the degradation of the strength of the drawn fiber. If at all possible, a solution to this problem should not be capital intensive.

SUMMARY OF THE INVENTION

The foregoing needs for providing a clean air delivery system to fiber drawing apparatus have been met by this invention. Lightguide fiber is drawn from a necked-down portion of a vertically suspended preform which is heated by one of several different kinds of heating apparatus. The drawn fiber is advanced along a path, measured, then coated, cured, and remeasured. Along the preform and the fiber to a point beyond a coating applicator, an enclosure is provided to substantially isolate the preform, fiber, and portions of the drawing apparatus from the ambient air. During the drawing of the fiber, air having a specified cleanliness is directed past the preform and the drawn lightguide fiber. The direction of the air flow is transverse of the fiber and in a plane which includes the path of the drawn lightguide fiber. Inasmuch as the air is flowed from an entry into the enclosure and out of the enclosure through an opening that is opposite to the entry, the flow of the air past the preform and the fiber is substantially laminar.

Also, the air which is drawn from the room in which the drawing apparatus is located is flowed at a controlled velocity in order to avoid degradation of the product. By limiting the velocity of the air, disturbances to the drawn fiber are prevented. If the velocity was excessively high, the drawn fiber would be moved in an uncontrolled manner from its path to a degree which affects its centering in the coating and the control of the diameter of the drawn fiber.

The clean air delivery system of this invention is effective to use room air and to filter that air as it is moved from an intake end of a flow passage to the preform and the fiber. The filtering arrangement is such that the efficiency of the filters increases in a direction from the intake end to the delivery point in the vicinity of the preform and the fiber. Advantageously, the frequency of filter service in this arrangement decreases in the direction of flow. Filters closest to the drawing apparatus which are the most difficult to access require the least change or service.

BRIEF DESCRIPTION OF THE DRAWINGS

Other features of the present invention will be more readily understood from the following detailed description of specific embodiments thereof when read in conjunction with accompanying drawings, in which:

FIG. 1 is an overall view of a pair of clean air delivery systems of this invention;

FIG. 2 is an enlarged view of a portion of a lightguide fiber drawing apparatus and of a portion of the system of this invention for the delivering clean air to the drawing apparatus;

FIG. 3 is an enlarged plan view of a fiber enclosure portion of the clean air delivery system of this invention;

FIG. 4 is a view of a frontal portion of facilities for containing a preform and fiber which is drawn therefrom; and FIG. 5 is a front elevation view of a system of this invention to show an alternate embodiment of a stack of enclosure units for the preform and the fiber.

DETAILED DESCRIPTION OF THE INVENTION

Referring now to FIGS. 1 and 2, there are shown two systems designated generally by the numerals 20 and 20' which provide air having a predetermined cleanliness to apparatus for producing lightguide fiber 21 from a preform 22 which is vertically suspended along an axis 25. Portions of the systems 20 and 20' are supported by a pair of side-by-side towers 23 and 23' on each of which is mounted a drawing apparatus, that is designated generally by the numeral 24 (see FIG. 2). The arrangement of the towers 23 and 23' and the two drawing apparatus is such that a framework 26 including a centrally disposed ladder is positioned centrally between them to allow operator access to all levels of the towers.

Hereinafter, the system 20 which is associated with the left one of the drawing apparatus 24, as viewed in FIG. 1, will be described. It should be understood that the portions of the system which are associated with the other drawing apparatus is essentially identical and the identifying numerals have primed superscripts.

Going now to FIG. 2, there is shown a view in front elevation of one of the drawing apparatus 24 as well as associated portions of its clean air delivery system 20. The preform 22 is suspended in a chuck 31 which is moved downwardly to feed a lower end of the preform into a heating device such as a furnace 32. Lightguide fiber 21 is drawn from a necked-down lower portion of the preform 22. The drawn lightguide fiber 21 is advanced past a measuring device 33, coated by an applicator 34, cured by a device 36, and then remeasured by apparatus 37. The coated fiber 21 is advanced through a capstan 38 and taken up on spools (not shown).

The system 20 which is shown in FIGS. 1 and 2 includes provisions for delivering air having a specified cleanliness to selected portions of each draw tower 23. It has been proposed that the drawing be accomplished in an environment which falls in an air cleanliness class of 100. A known standard for clean room and work station controlled environments forms a part of Federal standards No. 209B dated Apr. 24, 1973, which was approved by the Commissioner, Federal Supply Service, General Services Administration. In that specification in Table 1 on Page 4, air cleanliness classes include the following characterization for Class 100. Class 100 air is defined to be air which includes a maximum of 100 particles per cubic foot of 0.5 microns and larger and a maximum less than 10 of particles per cubic foot of 5 microns and larger.

The portion of the clean air delivery system 20 which is associated with each draw tower 23 includes an intake 41 into which room air is pulled. The system 30 also includes a plenum 43 having a plurality of filters 46, 47, and 49.

The filters 46, 47, and 49 are arranged in a predetermined manner in accordance with their efficiencies. Efficiency tests for air filters measure the percentage of foreign particulate matter in the air being filtered and which is collected by the filter. This percentage may be expressed on the basis of weight, number, discoloration effect or by other means. The efficiency is affected not only by the size and imposition of the foreign particles but also the face velocity at which the filter is being operated and the degree to which it is loaded with accumulated foreign particles.

One special efficiency test is referred to as the dioctylphthalate smoke test (DOP smoke test) in which the amount of smoke that penetrates the filter is measured. Test operators maintain the particle diameter of the smoke at 0.3 microns which is usually considered to be the most difficult size to remove with strainer type filters. Particles smaller than this size do not tend to follow the air stream through the filter. Another well known test is termed the ASHRAE test.

Based on the DOP smoke test, filters are designated by their efficiencies. A filter is designated ABSOLUTE if its efficiency is in the range of 97% to 99% with those having an efficiency in the range of 2% to 5% such as those used in the home being described as throwaway type filters.

The filters 46, 47, and 49 in the system 20 are arranged in ascending magnitude of efficiency in a direction toward the draw tower 23. Accordingly, the filter 46 has an efficiency in the range of about 2–5% as measured by the DOP test and may be one such as a FARR 30/30 filter. Proceeding inwardly from the intake, the next filter, one designated 47, has an efficiency in the range of 90% as measured by the ASHRAE test and may be one marketed by Flanders Company and designated A040-L. The last filter in the plenum 43, the one designated 49, is one having a DOP efficiency of 99.97%. Such a filter may be a HEPA filter designated T-7045-U as marketed by the Flanders Company.

Air from the room in which the draw tower 23 is situated is caused to be moved into the intake by a fan 51. The fan 51 must be such as to move the air at a controlled velocity through the system 20 and into the vicinity of the preform 22 and the fiber 21. It has been found that a Trane Draw Thru Cabinet Fan No. 3 which is rated at 1800 C.F.M. at 3.25 inches water gage is suitable for the system 20 of this invention.

From the plenum fan 51, the air is moved into a plenum 52 from which ducts extend to the drawing apparatus 24 to direct air into the vicinity of the preform 22 and the fiber 21. As should be observed from FIG. 1, a plurality of ducts 56, 57, and 58 extend from the plenum 52 with each duct arranged to deliver filtered air to a portion of the height of the draw tower 23.

In order to have a more manageable containment of the preform and fiber 21 from the standpoint of control and maintenance, the height of the tower 23 from the preform 22 to the final measuring apparatus may be divided into three zones 61, 62, and 63. Each of these zones has a separate enclosure means for the fiber or preform and portions of the drawing apparatus 24 within the zone with each enclosure being supplied by an associated one of the ducts 56, 57, or 58. The enclosure means which partially surround the preform 22 and portions of the drawn fiber 21 and drawing apparatus 24 are effective to substantially isolate the preform and portions of the drawn fiber and the drawing apparatus from the ambient air of the room in which the drawing apparatus is located.

Accordingly, the clean air delivery system 20 of this invention is arranged with a plurality of enclosures 66, 67, and 68 stacked one upon the other in each draw tower. For example, in a typical arrangement three such units would be stacked one upon the other in order to form the overall clean air delivery containment means. In one embodiment, each of the units has a front to back distance of about 12 inches and a height of about 3 feet. By arranging this system in stacked units, any length draw tower may be served and may be custom-fitted depending on the particular requirements for the fiber.

As can best be seen from FIGS. 1-3, each enclosure means 66, 67, or 68 can best be described by considering a plane through the fiber 21 or preform 22 and transversely thereof. Each enclosure means such as that designated generally by the numeral 68 includes a fixed rear wall 69 and a side panel 71. The rear wall 69 is supported from the tower 23 as is the side 71. The uppermost enclosure 66 is also provided with a ceiling 70. It is seen that the enclosures 66, 67, and 68 also include front moveable panels designated 72, 73, and 74, respectively. The middle moveable panel 73 is notched to permit the location of a pyrometer (not shown) adjacent to the furnace 32. As is best seen in FIG. 4, each of the moveable front panels 72, 73, and 74 is mounted on casters 75—75 to permit operator access to portions of the drawing apparatus 24.

Each of the enclosures 66, 67, and 68 includes an opening or open side. Viewing now FIGS. 1-3, it can be seen that the enclosure 66 has an opening 76, the enclosure 67, an opening 77, and the enclosure 68, an opening 78. Also, it should be appreciated that the openings 76, 77, and 78 of each two corresponding sets of enclosure means 66—66', 67—67', and 68—68' are opposite one another.

Each of the ducts 56, 57, and 58 communicates with its associated enclosure means through associated air delivery ends 81, 82, and 83 in the side panels 71—71 which provides exits for the air of the delivery system 20. At least a portion of each duct which connects the plenum 52 with each enclosure means, and which is adjacent to its exit is made of a flexible conduit. In FIGS. 1 and 2, the flexible portions of the ducts are designated by the numerals 84, 85, and 86. The use of flexible conduits immediately adjacent to the fiber 21 prevents the transmittal of undue vibrations from the delivery system to the enclosures.

A final filter for the delivery system associated with each of the enclosures 66, 67, and 68 is positioned between each of the air delivery ends 81, 82, and 83 and the side panel 71 of each enclosure. These filters are designated 87, 88, and 89 and in a preferred embodiment are HEPA-scanned ABSOLUTE filters such as Flanders filter model 7045-SU having an efficiency of 99.97% in accordance with the DOP test.

The above-described arrangement of filters is advantageous from a maintenance standpoint. It should be noted that the filters 46, 47, and 49 are arranged such that the filter which must be changed most frequently is that designated 46 and is the most remote from the drawn fiber 21. As one proceeds from the filter 46 and toward the fiber 21, the other filters must be replaced less frequently until the filters 87, 88, and 89 (see FIG. 3) which are immediately adjacent the lightguide fiber are changed very infrequently. This is very advantageous with respect to maintenance. As can be imagined, the filters which are closest to the drawing apparatus 24 itself are the most difficult to access and hence the most expensive to change.

The open side of each enclosure means is opposite to the air delivery end of the associated duct. For example, the opening 78 of the enclosure 68 as seen in FIG. 3 is opposite to the air delivery end 83 of the duct 86. This encourages substantially laminar flow of the clean air past the preform because of the generally unobstructed path. By avoiding turbulence in the delivered air, the system 20 avoids causing the fiber 21 to deviate from a predetermined path of travel.

The clean air delivery control system 20 also includes measurement devices to facilitate the system operation. For example, a plurality of gages are arranged in the plenums 43 and 52 and in the ducts in order to determine the pressure drop. This is advantageous from the standpoint of being able to determine when to change the filters.

It is also critical that the air be delivered through the plenums and the ducts at a predetermined velocity. Should the velocity of the air be too high, the fiber could be moved laterally and perhaps caused to vibrate. This, of course, could have serious effects on the control of the fiber diameter or the centering of the fiber in the coating by perhaps miscentering the fiber in the applicator 34. Accordingly, experiments have been conducted to determine the critical velocity. It has been found a velocity of about 125 feet per minute is a suitable upper limit for the air delivered by the system 20 of this invention. The plenum chambers 43 and 52 and the ducts are sized in order to control the velocity of the air so that it does not exceed the critical value. Dampers (not shown) may also be used to control the velocity of the air.

The advantages of this system 20 are numerous. For example, by providing each draw tower 23 with its own clean air delivery system, the capital investment is reduced and also maintenance is rendered far less expensive. Secondly, operators have free access in and about the drawing apparatus for other operations which are not critical, such as for example, spool handling. Operators are not required to wear special clothing and are not subjected to operator inconvenience such as for example, air locks when entering and leaving the room. Another advantage is that if one of the draw towers 23—23 is shut down for maintenance, for example, then only the delivery control systems which are associated with it must be discontinued in their operation. Contrasted to this, should one of the apparatus in a clean room require maintenance, the entire delivery control system and hence the other apparatus in the room itself would be affected and would most probably have to be shut down.

In another embodiment 90 of this invention, which is shown in FIG. 5, a plurality of enclosure means 91, 92, and 93 are stacked as before. However, as will be observed from FIG. 5, the air delivery end of each of these enclosures is staggered from the vertical axis 25 of the preform 22 and the fiber 21. This arrangement is useful when retrofitting a draw tower 23 where the existence of auxiliary equipment such as piping and gauges may prevent the use of three equally dimensioned and/or perfectly aligned enclosure means.

As in the preferred embodiment, the enclosures 91, 92, and 93 are provided with cleaned air through flexible conduits 94, 95, and 96, respectively, and through final, relatively high efficiency filters 97, 98, and 99. The top and bottom enclosures 91 and 93 have been shortened somewhat relative to the center enclosure 92, presumably to avoid interference with other portions of the draw tower 23.

It is to be understood that the above-described arrangements are simply illustrative of the invention. Other arrangements may be devised by those skilled in the art which will embody the principles of the invention and fall within the spirit and scope thereof.

What is claimed is:

1. A delivery system for providing air having a predetermined cleanliness to a drawing apparatus in which lightguide fiber is drawn from a preform, said system including:
    means defining a flow passage having a first end which communicates with air that is ambient to the drawing apparatus for providing an intake for ambient air and having a second end for providing an exit adjacent to the preform and the fiber;
    enclosure means for partially surrounding at least a portion of the preform, a portion of a length of the drawn fiber and portions of the drawing apparatus to substantially isolate the portions of the preform, the fiber and the drawing apparatus from the ambient air, said enclosure means communicating with said second end of said flow passage and having an opening which is opposite to said second end of said flow passage;
    moving means for causing ambient air to be drawn into said intake, flowed through said flow passage into said enclosure means and directed transversely past the preform and the fiber and through said opening in a substantially laminar flow; and
    filter means mounted in said flow passage for removing contaminants from the air in said flow passage to cause the air that is directed past the preform and the fiber to have a predetermined cleanliness.

2. The system of claim 1, wherein said moving means causes the air to be flowed past the fiber at a velocity which is sufficiently low to avoid undue lateral movement of the fiber.

3. The system of claim 1, wherein said filter means includes a plurality of filters which are spaced along said flow passage with the percent efficiency of said filters increasing in a direction from said intake to said exit of said flow passage.

4. A delivery system for providing air having a predetermined cleanliness to a drawing apparatus in which lightguide fiber is drawn from a preform which is suspended with a longitudinal axis thereof being oriented vertically, said system including:
    enclosure means for partially surrounding at least a portion of the preform, a portion of a length of the drawn fiber and portions of the drawing apparatus to substantially isolate the portions of the preform, the fiber and the drawing apparatus from ambient air, said enclosure means including a plurality of unit sections which are stacked to provide an enclosure means having a predetermined height with each unit section having an opening at each of its ends to permit passage of the fiber therethrough and an opening in a sidewall thereof;
    means defining a flow passage being associated with each said unit section and having a first end, which communicates with air that is ambient to the drawing apparatus for providing an intake for ambient air, and having a second end for providing an exit that communicates with the associated unit section, said opening in the sidewall of each said unit section being opposite to said exit of the associated flow passage;
    moving means for causing ambient air to be drawn into each said intake, flowed through each of said flow passages, and directed into said enclosure means transversely past the preform and the fiber and through said openings in said sidewalls of said unit sections; and
    filter means mounted in each said flow passage for removing contaminants to cause the air that is directed past the preform and the fiber to have a predetermined cleanliness.

5. The system of claim 4, wherein each said unit section comprises two parallel walls and a side panel which spans between said two parallel walls and which is connected to said second end of said associated flow passage.

6. The system of claim 5, wherein said stacked sections may be staggered as to the distance of said side panel of each from the preform and the drawn fiber.

7. A method of providing air having a predetermined cleanliness to drawing apparatus in which lightguide fiber is drawn from a preform, said method including the steps of:
    providing a flow passage having a first end which communicates with air that is ambient to the drawing apparatus and having a second end which is adjacent to the preform and the fiber, said flow passage being arranged to direct air transversely of the fiber and the preform;
    surrounding a portion of the preform and of the fiber with an enclosure which communicates with the second end of the flow passage and which has an opening that is opposite to the second end of the flow passage; and
    causing ambient air to be drawn into the first end of the flow passage, moved through the flow passage into the enclosure and directed in a substantially laminar flow transversely past the portions of the fiber and preform which are surrounded by the enclosure, and then through the opening; while filtering the air which is moved through the flow passage to remove contaminants and to cause the air that is directed past the fiber and the preform to have a predetermined cleanliness.

8. The method of claim 7, which is used to supply air having a predetermined cleanliness to each of two side-by-side drawing apparatus and wherein the opening which is associated with one of the drawing apparatus faces the opening which is associated with the other drawing apparatus.

9. The method of claim 7, wherein the filtering is accomplished with increasing efficiency as the air is flowed from the first end of the flow passage to the second end.

10. The method of claim 7, wherein the air is caused to be moved past the preform and the fiber at a velocity which is sufficiently low to avoid causing undue movement of the fiber laterally of its axis.

11. The method of claim 7, wherein the air which is directed into the enclosure and transversely past the fiber and preform has a cleanliness which is characterized in that the maximum number of particles per cubic foot having a size of at least 0.5 micron is 100 and the maximum number of particles per cubic foot having a size of at least 5 microns is less than 10.

12. A method of providing air having a predetermined cleanliness to drawing apparatus in which lightguide fiber is drawn from a preform which is suspended with a longitudinal axis thereof being oriented vertically, said method including the steps of:
 surrounding a portion of the preform and of the fiber with an enclosure, the enclosure including a unit section having a predetermined height and openings at ends to permit passage of the drawn fiber, and an opening in a sidewall thereof, and said step of surrounding includes stacking a plurality of the unit sections along the longitudinal axis of the preform and a path along which the fiber is drawn,
 providing a flow passage for each of the unit sections, each flow passage having a first end which communicates with air that is ambient to the drawing apparatus and having a second end, which communicates with an associated unit section and which is generally opposite to the opening in the sidewall of the associated unit section, said flow passage being arranged to direct air transversely of the fiber and the preform;
 causing ambient air to be drawn into the first end of each flow passage, moved through the flow passages, and directed into the unit sections of the enclosure transversely past the portions of the fiber and preform which are surrounded by the enclosure, and then through the openings in the sidewalls of the unit sections; while
 filtering the air which is moved through the flow passages to remove contaminants and to cause the air that is directed past the fiber and the preform to have a predetermined cleanliness.

13. The method of claim 12, wherein said step of surrounding a portion of the fiber and the preform includes providing each unit section with two generally parallel walls and a side panel and extending longitudinally along a path of the fiber, with the side panel spanning between the parallel walls and being connected to the second end of the associated flow passage.

14. The method of claim 13, wherein the distance of said second end of the flow passage from the side panel of each of the enclosures may be varied as among a plurality of stacked enclosures.

* * * * *